United States Patent [19]

Robinson et al.

[11] 4,071,159
[45] Jan. 31, 1978

[54] ELECTRICAL JUNCTION AND SWITCH BOXES

[75] Inventors: Richard L. Robinson, Bryant; Ivan L. Volgyesy, Camanche, both of Iowa

[73] Assignee: Indian Head Inc., New York, N.Y.

[21] Appl. No.: 701,090

[22] Filed: June 30, 1976

[51] Int. Cl.² .................................. H02G 3/14
[52] U.S. Cl. .......................... 220/3.2; 85/36; 220/3.5; 220/266
[58] Field of Search .......... 220/3.2, 3.3, 3.4, 3.5, 220/3.6, 266; 85/36

[56] References Cited

U.S. PATENT DOCUMENTS

| | | | |
|---|---|---|---|
| 3,575,313 | 4/1971 | Trachtenberg | 220/3.3 |
| 3,773,968 | 11/1973 | Copp | 220/266 X |
| 3,873,759 | 3/1975 | Schindler et al. | 220/3.3 X |
| 3,876,821 | 4/1975 | Pringle | 220/3.4 X |
| 3,895,732 | 7/1975 | Robinson et al. | 220/3.5 |
| 3,917,101 | 11/1975 | Ware | 220/266 X |
| 3,926,330 | 12/1975 | Deming et al. | 220/266 X |
| 3,952,475 | 4/1976 | Paskert | 220/3.4 X |
| 4,012,580 | 3/1977 | Arnold | 220/3.2 X |

Primary Examiner—Stephen Marcus
Attorney, Agent, or Firm—William R. Laney

[57] ABSTRACT

A molded synthetic resin open-sided box mountable in walls and ceilings for enclosing terminals and connections for electrical conductors extended through walls of the box, and providing access through a switch plate secured over the open side of the box. The box has integrally molded break-out windows extending between several of the intersecting walls of the box. Each of these break-out windows includes a removable panel retained in a surrounding opening by frangible interconnecting strips or bridge webs on opposite sides of the panel. Mounting screw holes are formed in the synthetic resin of the box at locations adjacent the open side thereof, and spring metal screw retaining clips are mounted in the box adjacent these holes so that parts of the clips project into the path of the shank of a screw extended into the holes to engage the threads on the shank.

1 Claim, 11 Drawing Figures

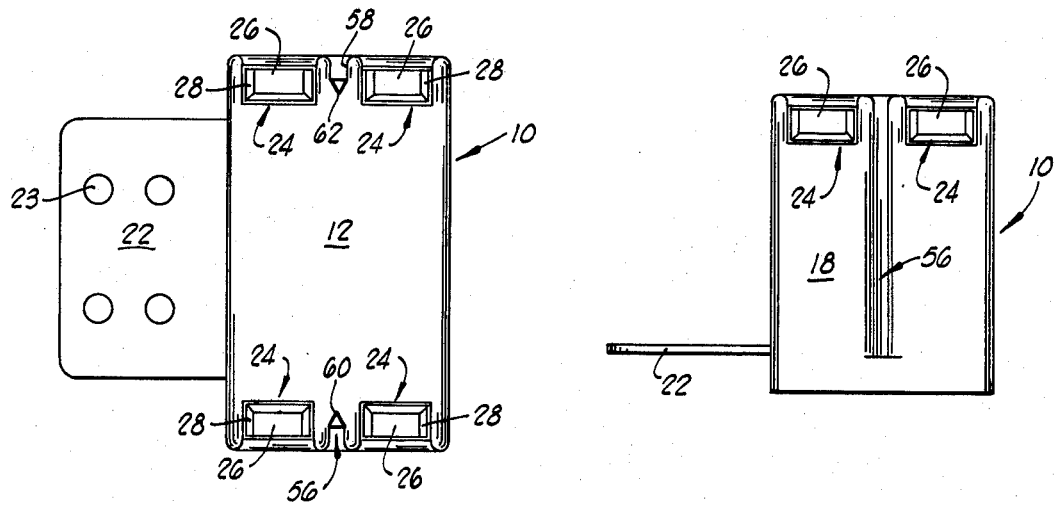
FIG. 1  FIG. 2
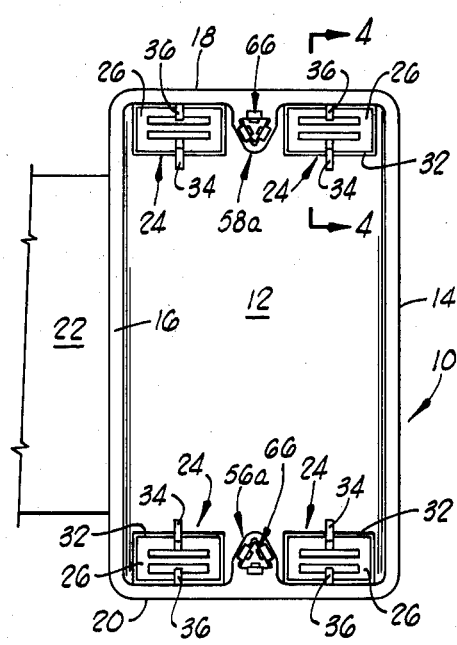 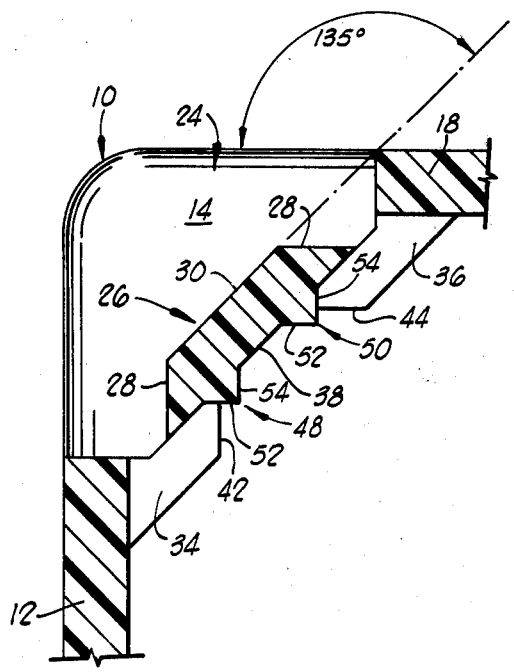
FIG. 3  FIG. 4

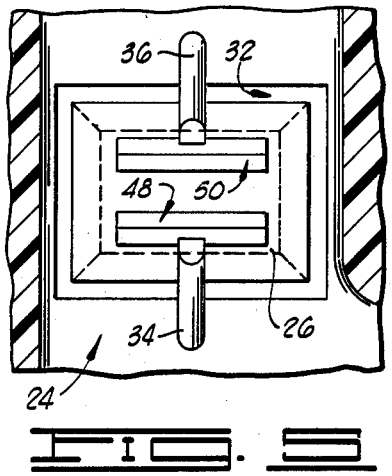
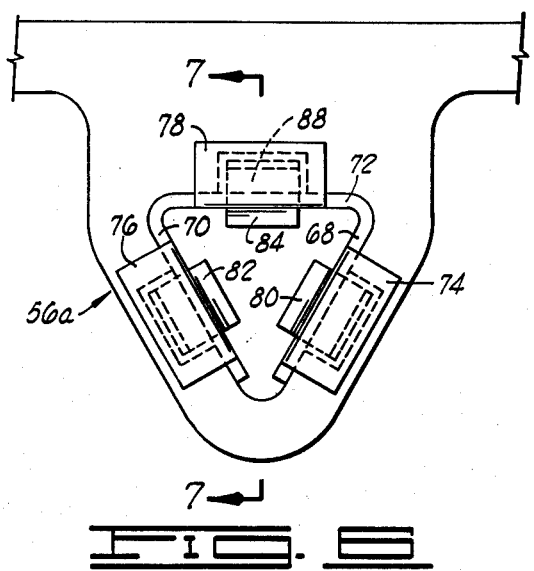
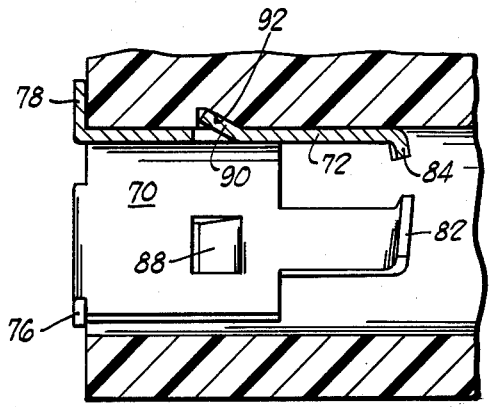
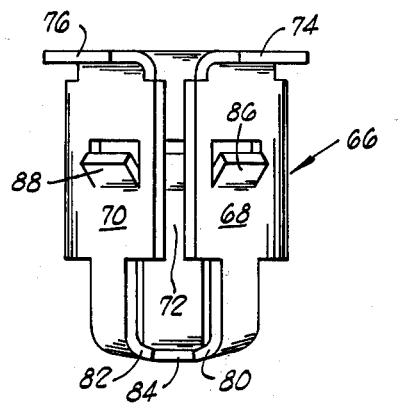
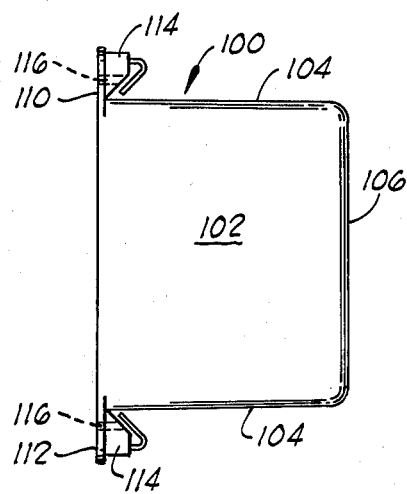
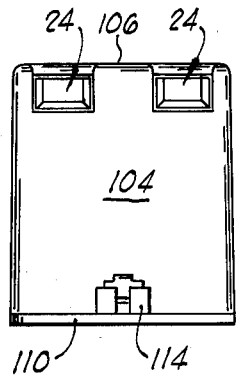
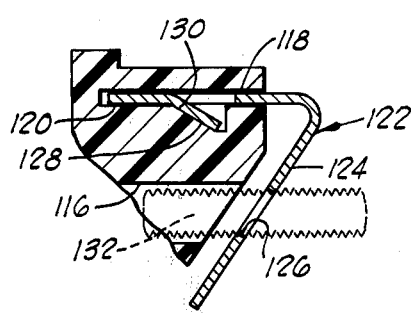

ELECTRICAL JUNCTION AND SWITCH BOXES

BACKGROUND OF THE INVENTION

1. Field of the Invention

This invention relates to synthetic resin electrical junction and switch boxes which include easily removable break-out panels or windows facilitating extension of electrical conductors through openings thus formed in side walls of the box, and which further provide spring metal clips in association with screw holes and facilitating rapid and easy securement of a cover plate over the open side of the box by means of threaded fastening elements.

2. Brief Description of the Prior Art

An improved synthetic resin electrical junction and switch box susceptible to construction by a one-shot, two-part molding process is described in Donald G. Copp U.S. Pat. No. 3,773,968 assigned to the assignee of the present invention. The synthetic resin box described in the Copp application works very well in practice, and can usually be constructed with no difficulty by a one-shot molding process. Where some types of plastic materials are employed in molding the box, however, some difficulty has been encountered in obtaining accurate molding of the knockout panels or windows formed in such boxes in a way such that the required spacing or separation of these windows or panels from the remainder of the box is attained.

Another type of synthetic resin electrical junction and switch box is described in our U.S. Pat. No. 3,895,732 issued July 22, 1975, and assigned to the assignee of the present invention. The synthetic resin box described in the latter patent includes integrally molded break-out windows or panels which are formed to lie in a plane which extends at an acute angle to two adjacent sides of the box and is surrounded by a gap or space separating it from the surrounding portions of the box. Two bridge webs hold the panel in position in the window opening and extend between adjacent sides of the box, and a pair or parallel guide ribs are provided on the inside surface of such removable panel. This construction assures that the panel or window can be easily pushed out from the side of the box by directing a screwdriver against the inside surface of the panel or window at such time as it is desired to extend electrical conductors from the outside to the inside of the box through the openings thus formed.

Another feature of the electrical junction and switch box described in our U.S. Pat. No. 3,895,732 is the inclusion of spring metal clips adjacent screw holes formed in, or adjacent, the side walls of the box, so that a cover or closure plate can be quickly and easily secured across the open side of the box, following completion of the electrical connections thereto, by the use of threaded screws or similar fasteners engaged with the clips.

BRIEF DESCRIPTION OF THE PRESENT INVENTION

The present invention is a synthetic resin electrical junction or switch box which is easily molded to provide the usual break-out windows or panels, but which provides such panels in a form and location such that they can be quickly and easily removed from inside the box, and which further provides, in conjunction with the panels at a location to provide maximum strength and service life to the box, a pair of integrally formed or molded screw hole-defining tubular portions. There are also provided at a pair of opposed locations on the box adjacent the screw holes thus defined, a pair of spring metal screw retention clips which are configured to provide positive engagement with a screw or other threaded shanked fastening element at locations on opposite sides of the threaded shank.

An important object of the present invention is to provide a synthetic resin electrical junction and switch box which has knock-out panels or windows which can be quickly and easily removed from inside the box, and which, by its construction, facilitates very rapid securement to the box of a cover plate or switch plate, using conventional threaded fasteners secured to cooperating screw retaining clips on the box.

Additional objects and advantages of the invention will become apparent as the following detailed description of preferred embodiments of the invention is read in conjunction with the accompanying drawings which illustrate the invention.

BRIEF DESCRIPTION OF THE DRAWINGS

FIG. 1 is a front elevation view of a synthetic resin switch box constructed in accordance with the present invention.

FIG. 2 is a bottom plan view of the synthetic resin switch box shown in FIG. 1.

FIG. 3 is a rear elevation view of the synthetic resin switch box shown in FIG. 1, and illustrating one mode of positioning the spring metal screw retaining clips in the switch box for the reception of screws having threaded shanks, and employed to secure a switch plate to the open front side of the box.

FIG. 4 is an enlarged sectional view taken along line 4—4 of FIG. 3, and illustrating the geometry and construction of one of the break-out windows provided in a synthetic resin switch box made in accordance with the invention.

FIG. 5 is an enlarged detail view of one of the break-out windows used in the switch box of the invention, and of a portion of the surrounding switch box, showing the window as it appears when viewed from the inside of the switch box.

FIG. 6 is an enlarged detail view illustrating the manner in which one of the spring metal screw retaining clips is pressed into and retained in a screw receiving hole molded in the switch box.

FIG. 7 is a sectional view taken along line 7—7 of FIG. 6.

FIG. 8 is a front elevation view of one type of spring metal screw retaining clip which can be utilized in one embodiment of the present invention.

FIG. 9 is a side elevation view of a different embodiment of switch box constructed in accordance with the present invention.

FIG. 10 is a side elevation view, taken 90° from the view of FIG. 9, of the embodiment of the switch box of the invention illustrated in FIG. 9.

FIG. 11 is an enlarged detail view of one of the screw-engaging clips utilized in the embodiment of the switch box illustrated in FIG. 9, and also illustrating a portion of the surrounding switch box in which the screw engaging clip is located.

DETAILED DESCRIPTION OF A PREFERRED EMBODIMENT OF THE INVENTION

One embodiment of a switch box constructed to incorporate the principles of the invention is designated generally by reference numeral 10. The box 10 includes a plurality of substantially monoplanar walls which define an enclosure which is open at one side thereof. The box 10 includes a back wall 12, a pair of side walls 14 and 16, a top wall 18 and a bottom wall 20. The walls are joined to each other at right angles so that the box is rectangular in cross-section. The open side of the box 10 is that side thereof which is opposite the back wall 12. In use, the open side of the box is closed, after installation of the box, by placement and securement of a switch plate or other suitable closure plate across the open side thereof, using screws or other suitable fastening devices.

A mounting plate 22 is molded integrally with the box and projects from the side wall 16 at substantially a right angle. The mounting plate 22 has a plurality of holes or apertures 23 formed therethrough to facilitate mounting the box in a wall, ceiling or other conventional location.

To permit electrical conductors to be extended from the outside to the inside of the box 10 for connection to electrical contacts or terminals inside the box, a plurality of break-out windows or panels 24 are formed in the box. Four of such break-out windows are illustrated in the embodiment of the invention shown in FIGS. 1-3.

Each break-out window 24 includes a removable panel 26 which can be of square or rectangular configuration, and which has beveled side edges 28. The panel 26 of each break-out window 24 generally occupies a plane which projects at an angle other than 90° to the walls of the box which are adjacent the respective panel, and between which the respective panel extends.

In FIG. 4 of the drawings, these walls are the top wall 18 and the back wall 12. As shown in FIG. 4, the angle defined between the panel 26 and the wall 18 is about 135°, but in various constructions the angle can be between about 120° and about 150°. The removable panel 26 is further shown by the detailed illustration in FIG. 4 to be geometrically configured and oriented so that its tapered side edges 28 extend in planes which are substantially parallel to the planes occupied by the nearest of the respective side wall 12 or 18. The general crosssectional configuration of the panel 26 is illustrated in FIG. 4 to be trapezoidal.

Each of the removable panels 26 forming a part of each break-out window 24 is surrounded by a space or opening 32 through the box which separates a major portion of the panel from the adjacent side walls of the box. A pair of bridge webs 34 and 36 form bridges extending between the removable panel 26 and adjacent portions of the box which, in the illustrated embodiment, are the top wall 18 and the back wall 12. The bridge webs 34 are relatively thin in transverse dimension, and are secured in position by molding one end into the adjacent side wall of the box and the other end into the back or inside surface of the removable panel 26.

It will be perceived that the inside surface 38 of the removable panel 26 extends substantially parallel to the outside surface 30, and that both these surfaces, in the illustrated embodiment, extend at an angle of substantially 45° with respect to the top wall 18 and the side wall 12. The same relationship characterizes the exposed surfaces of the bridge webs 34 and 36, except for the terminal surfaces 42 most nearly adjacent the removable panel 30. These surfaces extend substantially parallel to the nearest respective wall of the box. It will further be noted in referring to FIG. 5 that the interior surface of each of the bridge webs 34 and 36 is preferably semicylindrical in configuration.

Guide ribs 48 and 50 are formed on the inside surface 38 of each removable panel 26 and extend substantially parallel to each. Each guide rib 48 and 50 is of substantially right triangular cross-sectional configuration, and thus has a pair of exposed surfaces 52 and 54 facing toward the inside of the box. This configuration facilitates molding of the box 10 by the oneshot, two-mold part procedure to which reference has hereinbefore been made. The spaced guide ribs 48 and 50 function to permit the point of a screwdriver or similar implement to be placed between the ribs when the removable panel 26 is to be snapped or broken out of the box. This occurs at the time when the installer of the box wishes to extend the end portions of electrical conductors from the outside to the inside of the box for connection to terminals in the box. It will be noted that the inner ends of the bridge webs 34 and 36, in addition to being merged by molding with the back surface of the removable panel 26 are also joined or merged with a median portion of the two guide ribs 48 and 50. This assures that the bridge webs 34 and 36 will afford sufficient retention strength to assure that the removable panels 26 remain in their closing positions until intentionally removed by a workman using a screwdriver to force them out of the box.

In the embodiment of the invention illustrated in FIGS. 1-8, a pair of enlongated, inwardly turned channels or screw hole-defining tubular portions 56 and 58 are formed in the top wall 18 and bottom wall 20 of the box. The channels 56 and 58 are molded in the walls of the box by turning inwardly the central portion of the top wall 18 and bottom wall 20 to form a deep indentation or trough extending over a major portion of the length of these two walls. Adjacent those edges of the top wall 18 and bottom wall 20 of the box which lies nearest the open side of the box, the respective channels 56 and 58 are closed to provide a screw hole defining tubular end portions 56a and 58a, respectively, having screw holes 60 and 62, respectively, formed therethrough. The screw holes 60 and 62 are each of substantially triangular cross-sectional configuration.

A spring metal screw retaining clip 66 of the configuration shown in FIG. 8 is pressed into each of the screw holes 60 and 62, as best shown in FIG. 7. Each screw retaining clip 66 includes three side portions 68, 70 and 72 which are integrally connected through bend lines so that each of the side portions preferably extends at an angle of about 60° with respect to the adjacent side portion (see FIG. 6).

At the upper end of each of the side portions 68, 70 and 72 of each clip 66, the spring metal is bent over at a right angle to provide limiting flanges 74, 76 and 78. At the lower end of each of the side portions, 68, 70 and 72, the several side portions are bent inwardly in a reverse direction from the direction of bending of the flanges 74, 76 and 78 to form inwardly extending screw-engaging flanges 80, 82 and 84, respectively. A barb or tine is pressed out of each of the side portions 68, 70 and 72 and projects upwardly toward the respective limiting flange 74, 76 and 78, and at an acute angle to the major plane of the respective side portion from which it is pressed. These tines are designated by reference numerals 86, 88 and 90 in the drawings.

When the screw retaining clips 66 are pressed into their respective holes 60 and 62, the tines 86, 88 and 90 mate with small recesses or reliefs 92 formed in the defining side walls of the screw holes, and extend at an angle to the faces of the box such that the clips are retained against pulling out of the screw holes. The limiting flanges 74, 76 and 78 bear against the top end of the screw hole defining tubular portions in which the respective clips 66 are inserted. It will be noted in referring to FIGS. 6-8 of the drawings that the in-turned screw-engaging flanges 80, 82 and 84 of each screw retaining clip 66 define between them, a small central aperture or passageway through which the point of the screw may be extended, but which is not sufficiently large to permit the enlarged portion of the threaded shank of the screw to be extended without firm interlocking engagement of these flanges with the threads of the screw.

A different embodiment of the invention is illustrated in FIGS. 9-11. In the embodiment of the invention here illustrated, a synthetic resin electrical junction box 100 includes opposed side walls 102, a top wall 104 and a back wall 106. A pair of spaced break-out windows 24 of the type hereinbefore described are formed in a plane extending at an acute angle between the top and bottom walls 104 and the back wall 106.

Secured to the top and bottom walls 104 adjacent the open side of the box (which is to the left in FIG. 9, and is opposite the back wall 106), are a pair of flanges 110 and 112. The flange 110 extends substantially normal to the top wall 104, and had one of its surfaces in coplanar alignment with the plane of the opening at the front side of the box 100. The flange 112 extends substantially normal to the bottom wall 104, and has one of its surfaces in coplanar alignment with the flange 110 and with the plane of the opening into the box.

The flanges 110 and 112 function to accommodate, and to mount to the top and bottom walls of the box 100, a pair of screw hole defining portions 114 which are identically configured, and are secured to that side of the respective flanges 110 and 112 which is opposite the side thereof in alignment with the plane of the opening into the box. It will be noted in referring to FIG. 9 that each of the screw hole defining portions 114 is substantially trapezoidal in side elevational configuration, and each defines a tubular screw hole 116 projecting through the screw hole defining portion in alignment with a screw aperture or opening through the respective flange 110 or 112.

Each screw hole defining portion 114 also defines a slot 118 (see FIG. 11) which extends substantially parallel to the tubular screw hole 116 and functions to receive one leg 120 of a V-shaped screw retaining spring metal clip, designated generally by reference numeral 122. Each of the screw retaining clips 122 includes, in addition to the leg 120, a second leg 124 which is reverse bent in respect to the leg 120 and defines an acute angle therewith. The leg 124 of the screw retaining clip 122 has a circular hole or aperture 126 formed therein at a location spaced from the bend between the legs and in alignment with the tubular screw hole 116 formed through the respective screw hole defining portion 114 as shown in FIG. 11. Each of the screw retaining clips 122 further includes a tab or tine 128 pressed out of the plane of the leg 120, and bent inwardly so as to extend toward or face the leg 124. The tab or tine 128 projects into a complementary slot or recess 130 formed in the respective screw hole defining portion 114 adjacent the slot 118 which receives the leg 120 of the clip 122.

In the use of the synthetic resin box 100, the break-out windows 24 are removed from the box during installation in the manner hereinbefore described. After effecting the desired electrical connections inside the box, the switch plate or other cover is then secured across the open front side of the box 100 by extending screws 132 through openings in the plate and into the screw holes 116 formed through the screw hole defining portions 114 on the box 100. The threaded shank of each screw then comes into contact with the leg 124 of one of the screwengaging clips 122, and tends to force or bias this leg 124 in a direction to result in an enlargement of the acute angle between the legs 120 and 124. As the leg 124 slips back over the threaded shank of the screw as the shank passes through the opening 126 in this leg, a ratcheting action occurs in which axially separated threads on opposite sides of and around the screw shank are interlocked and engaged by the edges of the leg 124 which surround and define the opening 126 therethrough. Rapid installation without excessive and difficult screwing of the screws can be effected by this arrangement.

From the foregoing description of a preferred embodiment of the invention, it will be apparent that various changes and innovations can be made in the illustrated and described structures without departure from the basic principles which underlie the invention. Innovations and modifications of this type which continue to rely upon such principles are therefore intended to be circumscribed by the spirit and scope of the present invention, except as the same may be necessarily limited by the appended claims or reasonable equivalents thereof.

What is claim is:

1. A molded synthetic resin electrical service box open at one side thereof and comprising:
    at least two walls each intersecting a third wall at substantially a right angle and terminating in side edges opposite the edge intersecting said third wall and adjacent the boundary of the opening at one side of said box;
    a flange projecting normal to and secured to each of said two walls adjacent the open side of the box, each of said flanges defining and carrying a tubular portion, and each of said tubular portions defining a screw hole having its axis extending substantially parallel to the adjacent one of said two walls;
    break-out windows extending between pairs of intersecting walls at an acute angle to each of said intersecting walls, each of said break-out windows comprising:
        a removable panel in a surrounding opening spacing the panel from the remainder of the box; and
        means bridging across said surrounding opening and interconnecting the panel with said respective intersecting wall pair; and
    spring metal screw-retaining clips pressed into said flanges and each including
        a barb engaging a portion of said flange at a location adjacent said tubular portion; and
        flange means defining a screw shank receiving opening coaxial with the axis of said screw hole and bounded by the flange means for engaging the threaded shank of a screw extended into the screw hole defined by said tubular portion, and through said flange means-defined opening, with said threaded shank engagement occurring on opposite sides of said screw shank.

* * * * *